US011793277B2

(12) United States Patent
Nishijima

(10) Patent No.: US 11,793,277 B2
(45) Date of Patent: Oct. 24, 2023

(54) CLEAT ADAPTER ASSEMBLY FOR CYCLING SHOE

(71) Applicant: Shimano Inc., Osaka (JP)

(72) Inventor: Shota Nishijima, Osaka (JP)

(73) Assignee: Shimano Inc., Osaka (JP)

( * ) Notice: Subject to any disclaimer, the term of this patent is extended or adjusted under 35 U.S.C. 154(b) by 148 days.

(21) Appl. No.: 17/502,707

(22) Filed: Oct. 15, 2021

(65) Prior Publication Data

US 2023/0119609 A1    Apr. 20, 2023

(51) Int. Cl.
  *A43B 5/14* (2006.01)
  *A43C 15/16* (2006.01)
  *B62M 3/08* (2006.01)

(52) U.S. Cl.
  CPC .............. *A43C 15/161* (2013.01); *A43B 5/14* (2013.01); *B62M 3/086* (2013.01)

(58) Field of Classification Search
  CPC .................................. A43B 5/14; B62M 3/086
  See application file for complete search history.

(56) References Cited

U.S. PATENT DOCUMENTS

| 5,125,173 A | * | 6/1992 | Nagano | B62M 3/086 |
| | | | | 36/131 |
| 5,213,009 A | | 5/1993 | Bryne | |
| 10,342,285 B2 | | 7/2019 | Aoki et al. | |
| 10,531,708 B2 | | 1/2020 | Schneider et al. | |
| 10,575,591 B2 | | 3/2020 | Schum et al. | |
| 2010/0146821 A1 | * | 6/2010 | Bryne | A43B 5/14 |
| | | | | 36/134 |
| 2012/0047772 A1 | * | 3/2012 | Lin | A43B 5/14 |
| | | | | 36/134 |
| 2014/0075786 A1 | * | 3/2014 | Bryne | A43B 5/14 |
| | | | | 36/25 R |

FOREIGN PATENT DOCUMENTS

EP    0895728 A1 * 10/1999

* cited by examiner

*Primary Examiner* — Ted Kavanaugh
(74) *Attorney, Agent, or Firm* — Global IP Counselors, LLP

(57) ABSTRACT

A cleat adapter assembly is provided for a cycling shoe. The cleat adapter assembly basically includes a first connecting portion, a second connecting portion and an adjuster. The first connecting portion is configured to be connected to a cleat. The second connecting portion is adjustably connected to the first connecting portion. The adjuster is configured to adjust a relative position between the first connecting portion and the second connection portion.

15 Claims, 10 Drawing Sheets

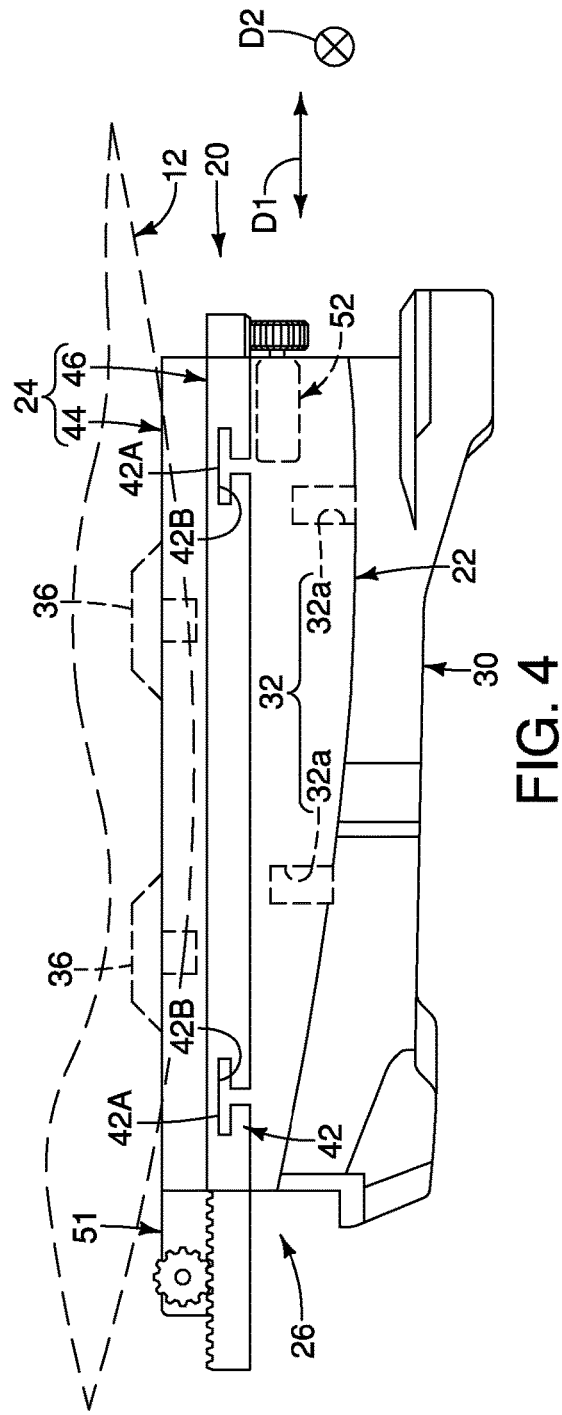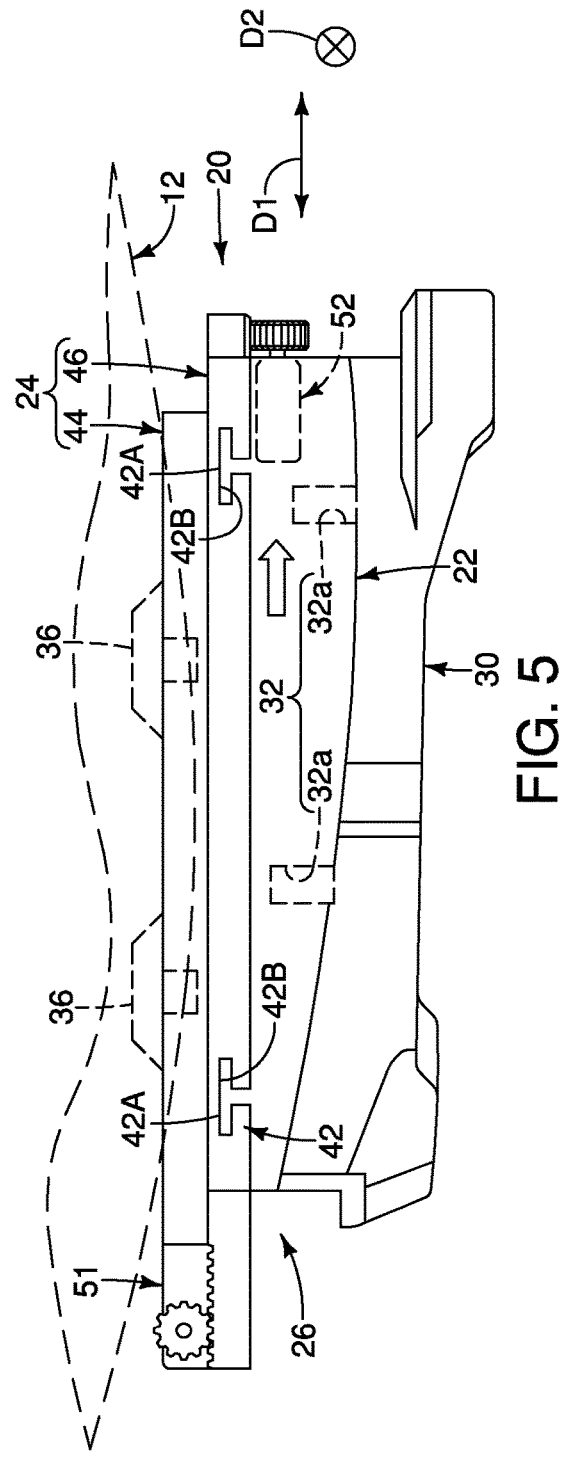

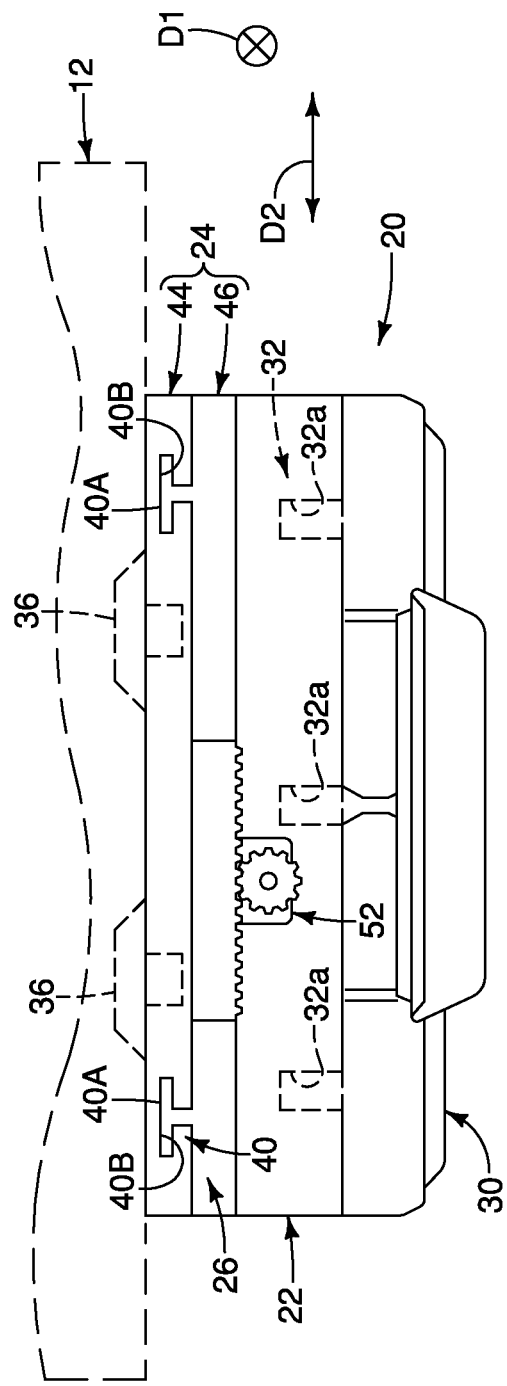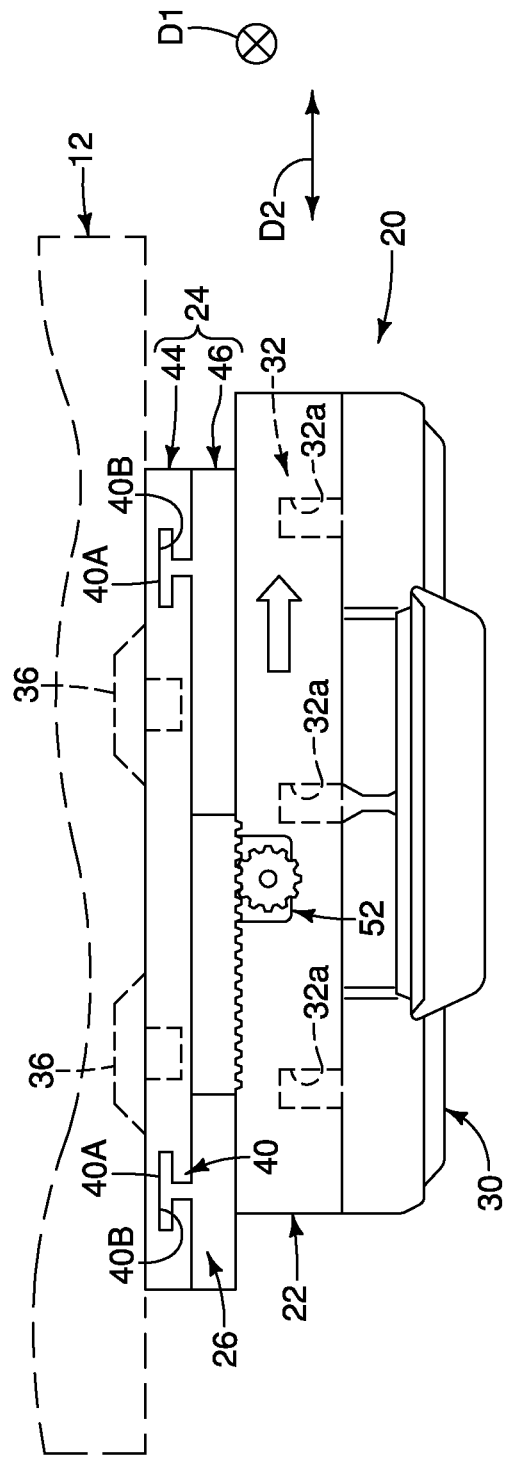

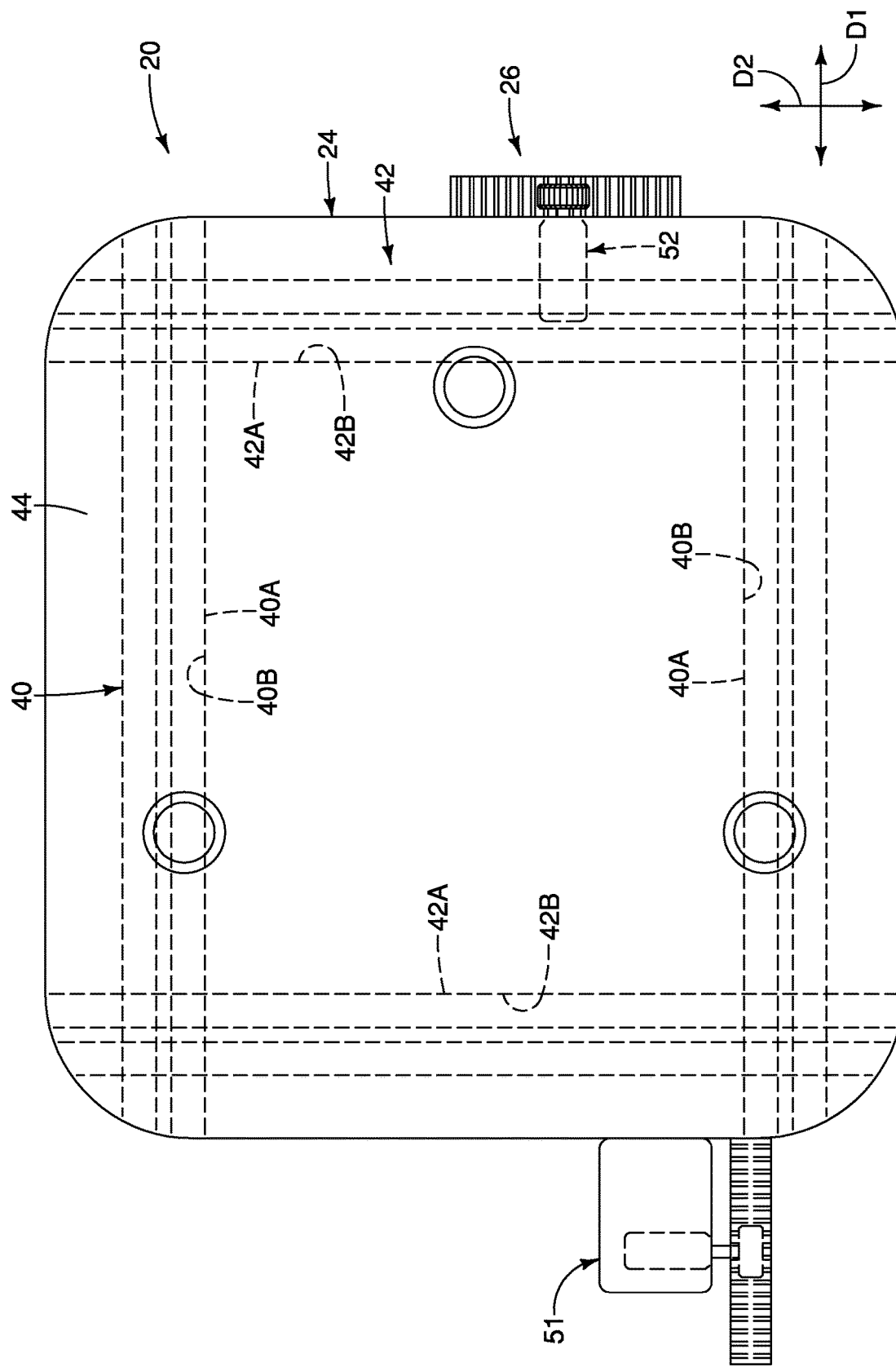

CLEAT ADAPTER ASSEMBLY FOR CYCLING SHOE

BACKGROUND

Technical Field

This disclosure generally relates to a cleat adapter assembly for a cycling shoe. More specifically, the present disclosure relates to a cleat adapter assembly for adjustably attaching a cleat to a cycling shoe.

Background Information

Various types of cycling shoes are available to suit a rider's riding style (e.g., road riding or off-road riding. Many bicycles use step-in or clipless pedals, which are used with cycling shoes having a cleat attached to the bottom of the sole. The step-in or clipless pedal engages the cleat to releasably secured to the pedal to the sole of the cycling shoe. In particular, with this type of bicycle pedal, the rider steps onto the pedal, and a clamping mechanism automatically grips the cleat to secure the pedal to the cleat. When releasing the shoe from the pedal, the rider will typically turn the shoe about an axis perpendicular to the tread of the pedal. As a result of the pivoting action, the clamping mechanism releases the cleat from the sole. Typically, the position of the cleat on the sole can be adjusted by loosening two or more bolts that fasten the cleat to the sole. For example, a cycling shoe that has a cleat fastened to the sole is disclosed in U.S. Pat. No. 10,342,285, which is assigned to Shimano Inc.

SUMMARY

Generally, the present disclosure is directed to various features of a cleat adapter assembly for a cycling shoe. Basically, the cleat adapter assembly connects a cleat to a sole of a cycling shoe. One object presented in the present disclosure is to provide a cleat adapter assembly that allows the position of the cleat to be adjusted on the sole.

In view of the state of the known technology and in accordance with a first aspect of the present disclosure, a cleat adapter assembly is provided for a cycling shoe. The cleat adapter assembly basically comprises a first connecting portion, a second connecting portion and an adjuster. The first connecting portion is configured to be connected to a cleat. The second connecting portion is adjustably connected to the first connecting portion. The adjuster is configured to adjust a relative position between the first connecting portion and the second connection portion.

With the cleat adapter assembly according to the first aspect, it is possible to adjust a position of a cleat relative to the sole without having to loosen the cleat relative to the sole.

In accordance with a second aspect of the present disclosure, the cleat adapter assembly according to the first aspect further comprises an input device configured to operate the adjuster.

With the cleat adapter assembly according to the second aspect, the adjuster can be easily operated using the input device.

In accordance with a third aspect of the present disclosure, the cleat adapter assembly according to the first aspect or the second aspect further comprises an actuator configured to actuate the adjuster, and a controller configured to control the actuator.

With the cleat adapter assembly according to the third aspect, the position of the cleat relative to the sole can be easily adjusted using an actuator.

In accordance with a fourth aspect of the present disclosure, the cleat adapter assembly according to any one of the first aspect to the third aspect is configured so that the first connecting portion includes a nut part configured to be fix the cleat to the first connecting portion, and the second connecting portion is provided to a sole of the cycling shoe.

With the cleat adapter assembly according to the fourth aspect, the cleat can be easily attached to the first connecting portion by at least one fixing bolt and retained to a sole of the cycling shoe via the second connecting portion.

In accordance with a fifth aspect of the present disclosure, the cleat adapter assembly according to any one of the first aspect to the fourth aspect is configured so that the controller is connected to the actuator by a wire to communicate.

With the cleat adapter assembly according to the fifth aspect, control signals from the controller can be reliably sent to the actuator for adjusting the position of a cleat relative to a sole.

In accordance with a sixth aspect of the present disclosure, the cleat adapter assembly according to any one of the first aspect to the fifth aspect is configured so that the actuator includes a first wireless communicator, and the controller includes a second wireless communicator configured to wirelessly communicate with the first wireless communicator.

With the cleat adapter assembly according to the sixth aspect, the actuator and the controller can be conveniently located without using an electrical cable.

In accordance with a seventh aspect of the present disclosure, the cleat adapter assembly according to any one of the first aspect to the sixth aspect is configured so that the controller is provided to one of the cycling shoe and an additional cycling shoe associated with the cycling shoe to constitute a pair of cycling shoes.

With the cleat adapter assembly according to the seventh aspect, it is possible to use a single controller for adjusting a position of each of the cleats of the cycling shoe and the additional cycling shoe associated with the cycling shoe.

In accordance with an eighth aspect of the present disclosure, the cleat adapter assembly according to any one of the first aspect to the seventh aspect is configured so that the adjuster is configured to adjust the relative position in a first direction and a second direction different with the first direction.

With the cleat adapter assembly according to the eighth aspect, it is possible to adjust the position of the cleat relative to the sole in two different directions.

In accordance with a ninth aspect of the present disclosure, the cleat adapter assembly according to the eighth aspect is configured so that the first direction is a longitudinal direction of a sole of the cycling shoe.

With the cleat adapter assembly according to the ninth aspect, it is possible to adjust the position of the cleat relative to the sole in the longitudinal direction of the sole of the cycling shoe.

In accordance with a tenth aspect of the present disclosure, the cleat adapter assembly according to the eighth aspect or the ninth aspect is configured so that the second direction is a lateral direction of a sole of the cycling shoe.

With the cleat adapter assembly according to the tenth aspect, it is possible to adjust the position of the cleat relative to the sole in the lateral direction of the sole of the cycling shoe.

In accordance with an eleventh aspect of the present disclosure, the cleat adapter assembly according to any one of the first aspect to the tenth aspect is configured so that the shoe includes a sole defining a longitudinal direction and a lateral direction perpendicular to the longitudinal direction, and the adjuster is configured to adjust the relative position in a rotational direction around an axis perpendicular to the longitudinal direction and the lateral direction.

With the cleat adapter assembly according to the eleventh aspect, it is possible to adjust the position of the cleat relative to the sole in the rotational direction of the sole of the cycling shoe.

In accordance with a twelfth aspect of the present disclosure, the cleat adapter assembly according to any one of the first aspect to the eleventh aspect further comprises an electric power source configured to provide an electric power to both of the actuator and the controller.

With the cleat adapter assembly according to the fourteenth aspect, the manufacturing costs of the cleat adapter assembly can be reduced by providing a single electric power source for both of the actuator and the controller.

In accordance with a thirteenth aspect of the present disclosure, the cleat adapter assembly according to the twelfth aspect is configured so that the electric power source includes at least one of a coin battery, a rechargeable battery, a capacitor and a power generator.

With the cleat adapter assembly according to the thirteenth aspect, it is possible to select an appropriate electric power source to provide an electric power.

In accordance with a fourteenth aspect of the present disclosure, the cleat adapter assembly according to the twelfth aspect or the thirteenth aspect is configured so that the electric power source has a first power source configured to provide the electric power to the actuator.

With the cleat adapter assembly according to the fourteenth aspect, it is possible to provide the electric power to the actuator using a first power source.

In accordance with a fifteenth aspect of the present disclosure, the cleat adapter assembly according to any one of the twelfth aspect to the fourteenth aspect is configured so that the electric power source has a second electric power source configured to provide an electric power to the controller.

With the cleat adapter assembly according to the fifteenth aspect, it is possible to provide the electric power to the actuator using a second power source.

In accordance with a sixteenth aspect of the present disclosure, the cleat adapter assembly according to any one of the first aspect to the fifteenth aspect is configured so that the actuator includes a motor configured to adjust the relative position in discrete steps.

With the cleat adapter assembly according to the sixteenth aspect, it is possible to precisely position the cleat relative to the sole.

Also, other objects, features, aspects and advantages of the disclosed cleat adapter assembly will become apparent to those skilled in the art from the following detailed description, which, taken in conjunction with the annexed drawings, discloses preferred embodiments of the cleat adapter assembly.

BRIEF DESCRIPTION OF THE DRAWINGS

Referring now to the attached drawings which form a part of this original disclosure.

FIG. 4 is an enlarged side elevational view of a portion of the cycling shoe illustrated in FIGS. 2 and 3 in which the cleat in a first longitudinal position relative to the sole of the cycling shoe.

FIG. 5 is an enlarged side elevational view of the portion of the cycling shoe illustrated in FIG. 4 in which the cleat in a second longitudinal position relative to the sole of the cycling shoe.

FIG. 6 is an enlarged front elevational view of a portion of the cycling shoe illustrated in FIGS. 2 and 3 in which the cleat in a first lateral position relative to the sole of the cycling shoe.

FIG. 7 is an enlarged front elevational view of the portion of the cycling shoe illustrated in FIG. 6 in which the cleat in a second lateral position relative to the sole of the cycling shoe.

FIG. 8 is an enlarged bottom plan view of the cleat adapter assembly illustrated in FIGS. 2 to 7.

DETAILED DESCRIPTION OF EMBODIMENTS

Selected embodiments will now be explained with reference to the drawings. It will be apparent to those skilled in the shoe field from this disclosure that the following descriptions of the embodiments are provided for illustration only and not for the purpose of limiting the invention as defined by the appended claims and their equivalents.

Figure 1:
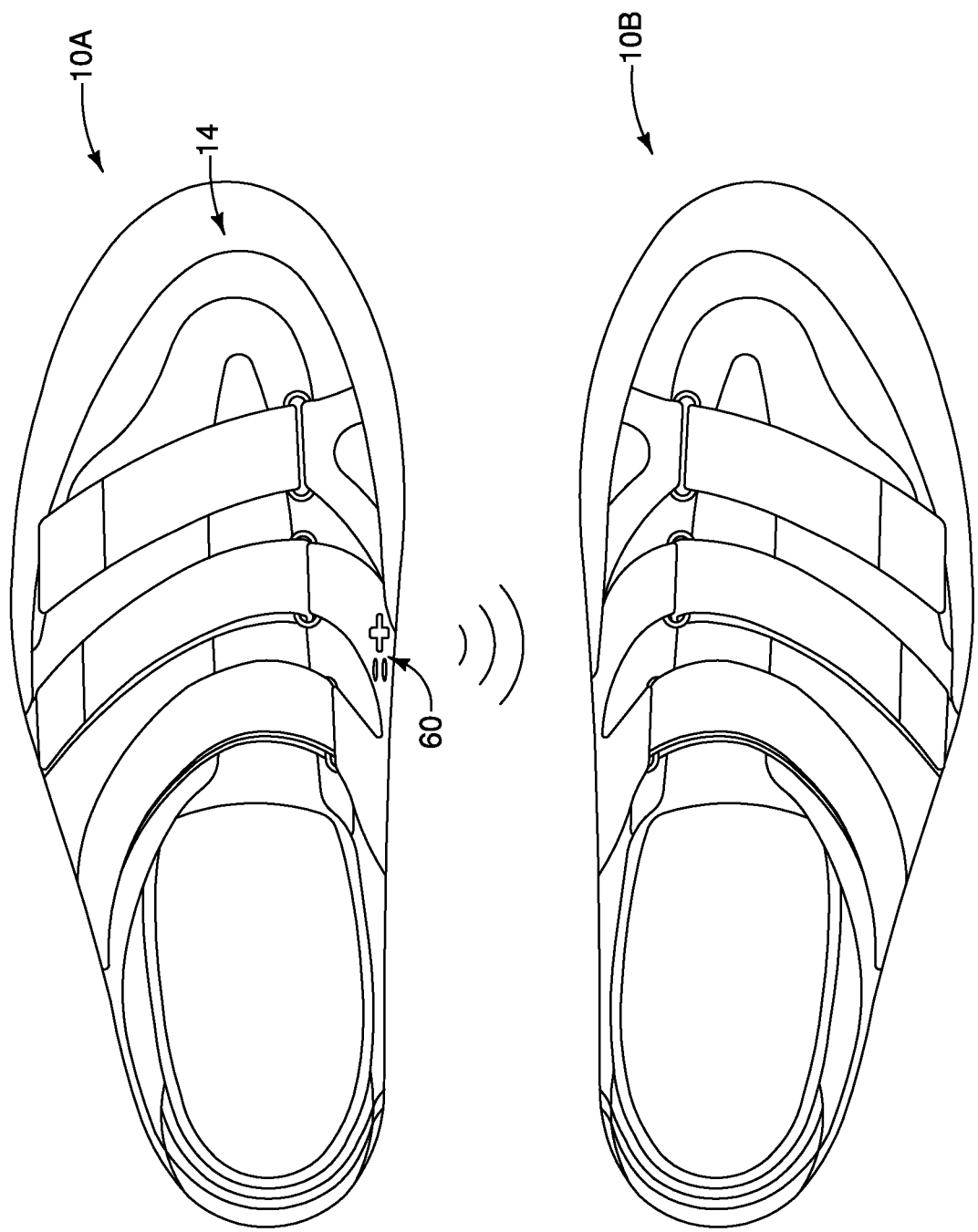
FIG. 1 is a top plan view of a pair of cycling shoes that equipped with a cleat adapter assembly in accordance with one embodiment.

Referring initially to FIG. 1, a first cycling shoe 10A and a second cycling shoe 10B are illustrated in accordance with a first illustrative embodiment of the present disclosure. The first cycling shoe 10A is a left cycling shoe and the second cycling shoe 10B is a right cycling shoe. The first cycling shoe 10A and the second cycling shoe 10B constitute a pair of cycling shoes. The second cycling shoe 10B can also be referred to as an additional cycling shoe associated with the first cycling shoe 10A to constitute a pair of cycling shoes. Also, as explained below, the second cycling shoe 10B is subordinate to the first cycling shoe 10A in that the user can input a cleat setting to the first cycling shoe 10A that is implemented in both the first cycling shoe 10A and the second cycling shoe 10B. However, it will be apparent to from this disclosure that the second cycling shoe 10B can be made to be the dominate shoe and the first cycling shoe 10A can be the subordinate shoe. Moreover, it will be apparent to from this disclosure that the cleat setting of the first cycling shoe 10A and the cleat setting of the second cycling shoe 10B can be independent (i.e., no communication between the first cycling shoe 10A and the second cycling shoe 10B).

For the sake of brevity, the following description will primarily focus on the first cycling shoe 10A, which will hereinafter be simply referred to as "the cycling shoe 10A".

It should be understood from the drawings and the description herein that the terms "inner side" and "inboard side" refer to the right side of a shoe for the left foot, and the left side of a shoe for the right foot. In other words, the inner side or the inboard side is the side of the shoe facing the shoe on the other foot of the wearer. Similarly, the terms outer side" and "outboard side" refer to the left side of the shoe for the left foot and the right side of the shoe for the right foot. The outer side or the outboard side is the side of the shoe facing away from the shoe on the other foot. As well, the terms "inner side" and "inboard side" are used interchangeably with respect to the present disclosure. Similarly, the terms "outer side" and "outboard side" are also used interchangeably with respect to the description of the present disclosure.

Figure 2:
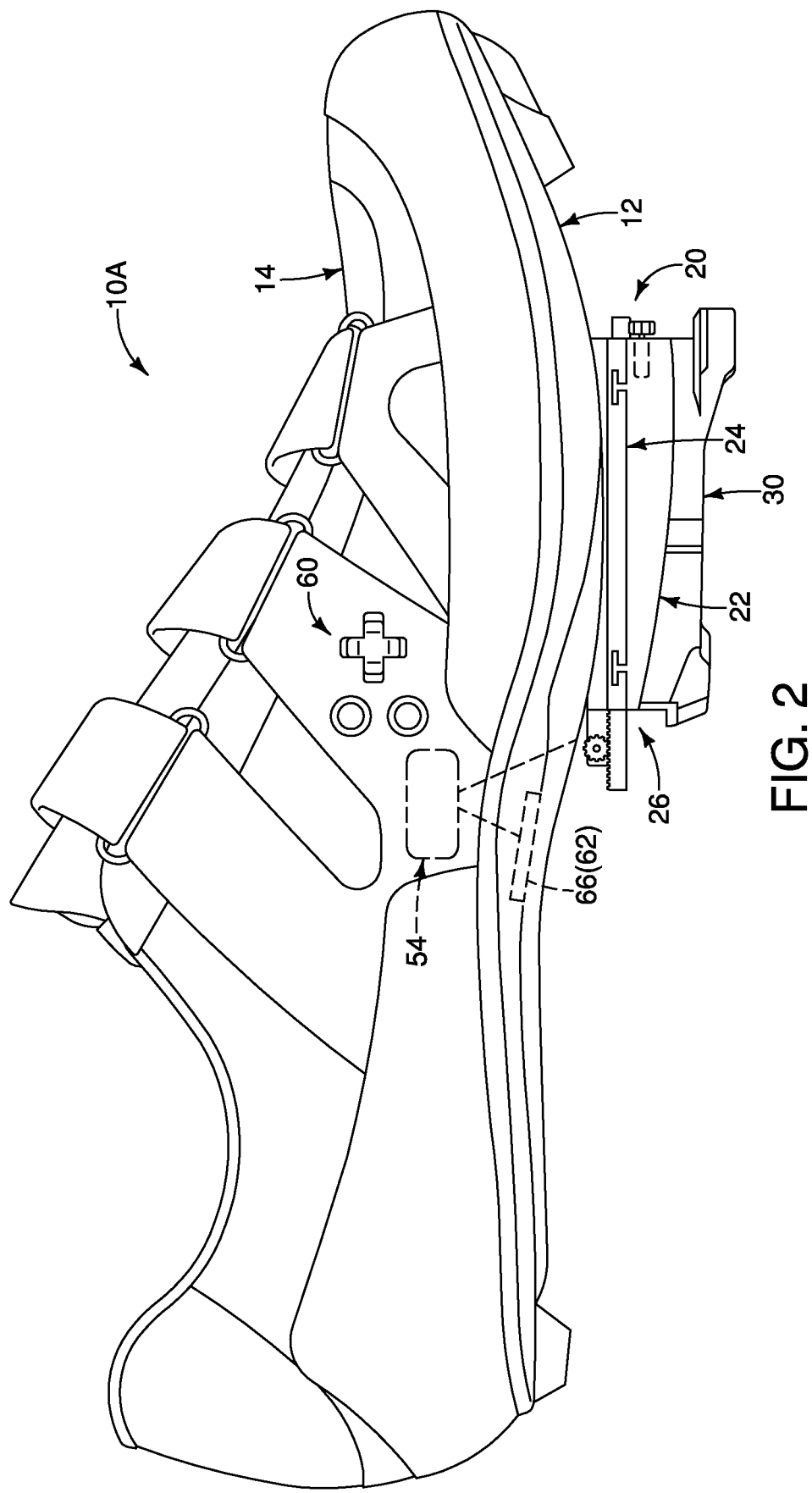
FIG. 2 is a side elevational view of one of the cycling shoes illustrated in FIG. 1.
Figure 3:
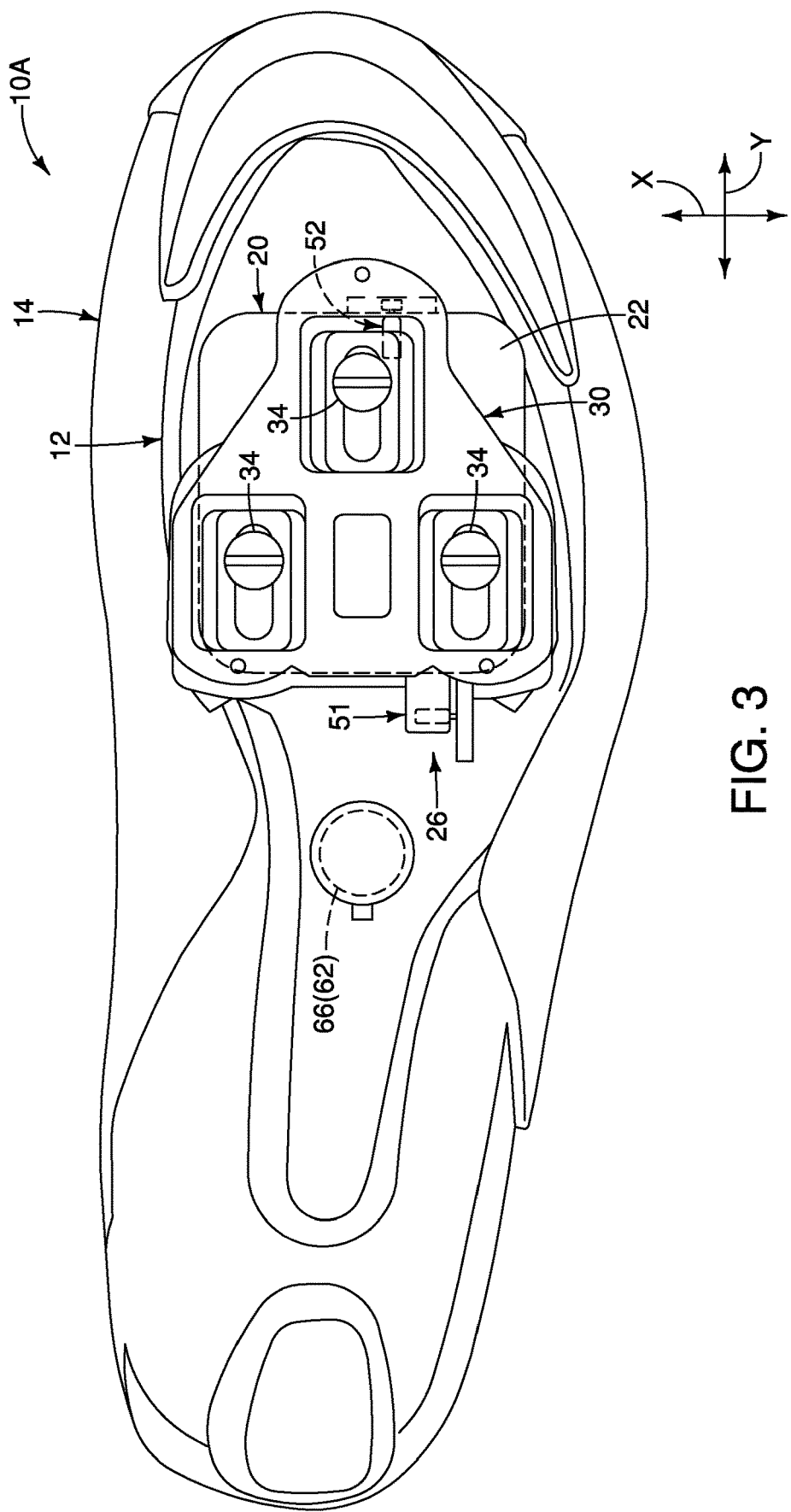
FIG. 3 is a bottom plan view of the cycling shoe illustrated in FIG. 2.

Referring now to FIG. 2, the cycling shoe 10A basically comprises a sole 12 and an upper 14. The sole 12 defines a longitudinal direction Y and a lateral direction X that is perpendicular to the longitudinal direction X. The sole 12 supports the upper 14. Specifically, the sole 12 is attached to the upper 14. The sole 12 can be fixedly attached to the upper 14 in a conventional manner, such as with stitching, adhesives, and/or embedding portions the upper 14 within the sole 12. Thus, the upper 14 and the sole 12 are integrated together. Here, the upper 14 is a low-cut style of upper. However, the upper 14 is not limited to the low-cut style, but may be of any style. The upper 14 is made of any suitable natural or polymetric materials. The upper 14 can be formed of an expandable material or a non-expandable material. For example, the upper 14 can be made of a leather material, a nylon mesh and/or any other material that is utilized for conventional uppers. The second cycling shoe 10B has the same basic construction as cycling shoe 10A In the first embodiment, as seen in FIGS. 2 to 8, a cleat adapter assembly 20 is provided for the cycling shoe 10A. The cleat adapter assembly 20 basically comprises a first connecting portion 22, a second connecting portion 24 and an adjuster 26. As explained below, the second cycling shoe 10B also includes a similar cleat adapter assembly that cooperates with the cleat adapter assembly 20 of the cycling shoe 10A. Alternatively, the second cycling shoe 10B can include the cleat adapter assembly 20 in the same manner as descried below with reference to the cycling shoe 10A.

The first connecting portion 22 is configured to be connected to a cleat 30. For example, here, the first connecting portion 22 includes a nut part 32 that configured to be fix the cleat 30 to the first connecting portion 22. More specifically, the nut part 32 includes a plurality of threaded holes 32a for threadedly receiving fixing screws 34. Thus, the cleat 30 is releasably coupled to the first connecting portion 22 in a reinstallable manner. Here, the cleat 30 is one of the standard types of cleats. However, any type of cleat can be used. Alternatively, the cleat 30 can be integrated into the first connecting portion 22 as a non-removable part of the first connecting portion 22. As explained below, the second connecting portion 24 is adjustably connected to the first connecting portion 22. In the first embodiment, the second connecting portion 24 is provided to the sole 12 of the cycling shoe 10A. Here, the second connecting portion 24 is releasably coupled to the sole 12 by a plurality of fasteners 36 (e.g., fixing screws). Alternatively, the second connecting portion 24 can be integrated into the sole 12 as a non-removable part of the sole 12.

The adjuster 26 is configured to adjust a relative position between the first connecting portion 22 and the second connecting portion 24. In the first embodiment, the adjuster 26 is configured to adjust the relative position in a first direction D1 and a second direction D2 different with the first direction D1. In FIGS. 6 and 7, the first direction D1 is indicated by the symbol "⊗"which indicates a direction perpendicular to the drawing sheet. In FIGS. 4 and 5, the second direction D2 is indicated by the symbol "⊗" which indicates a direction perpendicular to the drawing sheet. The first direction D1 is the longitudinal direction Y of the sole 12 of the cycling shoe 10A. The second direction D2 is the lateral direction X of the sole 12 of the cycling shoe 10A. Here, the adjuster 26 includes a first linear displacement device 40 and a second linear displacement device 42. The first linear displacement device 40 is configured to provide linear adjustment of the first connecting portion 22 in the first direction D1 (the longitudinal direction Y) of the sole 12 with respect the second connecting portion 24. The second linear displacement device 42 is configured to provide linear adjustment of the first connecting portion 22 in the second direction D2 (the lateral direction X) of the sole 12 with respect the second connecting portion 24.

In the first embodiment, the second connecting portion 24 includes a first part 44 and a second part 46. The first part 44 is fixed to the sole 12 by the fasteners 36. The second part 46 is adjustably coupled to the first part 44 by the first linear displacement device 40. The second part 46 is also adjustably coupled to the first connecting portion 22 by the second linear displacement device 42.

Here, for example, the first linear displacement device 40 includes a pair of first rails 40A and a pair of first tracks 40B. The first rails 40A are provided to one of the first part 44 and the second part 46, while the first tracks 40B are provided to the other one of the first part 44 and the second part 46. Here, the first rails 40A are provided to the second part 46, while the first tracks 40B are provided to the first part 44.

Also, for example, the second linear displacement device 42 includes a pair of second rails 42A and a pair of second tracks 42B. The second rails 40A are provided to one of the second part 46 and the first connecting portion 22, while the second tracks 40B are provided to the other one of the second part 46 and the first connecting portion 22. Here, the second rails 40A are provided to the first connecting portion 22, while the second tracks 40B are provided to the second part 46.

the cleat adapter assembly 20 further comprises an actuator 50 that is configured to actuate the adjuster 26. Here, in the first embodiment, the cleat 30 is movably with respect to the sole 12 in the first direction D1 (the longitudinal direction Y) and the second direction D2 (the lateral direction X) by the adjuster 26. To accomplish this two directions of movement, the actuator 50 includes a first actuator 50A and a second actuator 50B. The first actuator 50A is operatively coupled to the first linear displacement device 40. The second actuator 50B is operatively coupled to the second linear displacement device 42. In the first embodiment, the actuator 50 includes a motor that is configured to adjust the relative position in discrete steps. In particular, the first actuator 50A includes a first motor 51 that is configured to adjust the relative position in discrete steps. The second actuator 50B includes a second motor 52 that is configured to adjust the relative position in discrete steps. Preferably, the first motor 51 and the second motor 52 are reversible electric stepper motors.

The cleat adapter assembly 20 further comprises a controller 54 that is configured to control the actuator 50. The controller 54 is provided to one of the cycling shoe 10A and an additional cycling shoe 10B associated with the cycling shoe 10A to constitute a pair of cycling shoes. Here, the controller 54 is provided to the cycling shoe 10A. In the first embodiment, the controller 54 is configured to control the first motor 51 and the second motor 52. Also, the controller 54 is configured to control corresponding actuators of the additional or second cycling shoe 10B. However, as mentioned above, the second cycling shoe 10B can be independent from the cycling shoe 10A. Thus, the second cycling shoe 10B can be provided with its own controller.

Figure 9:
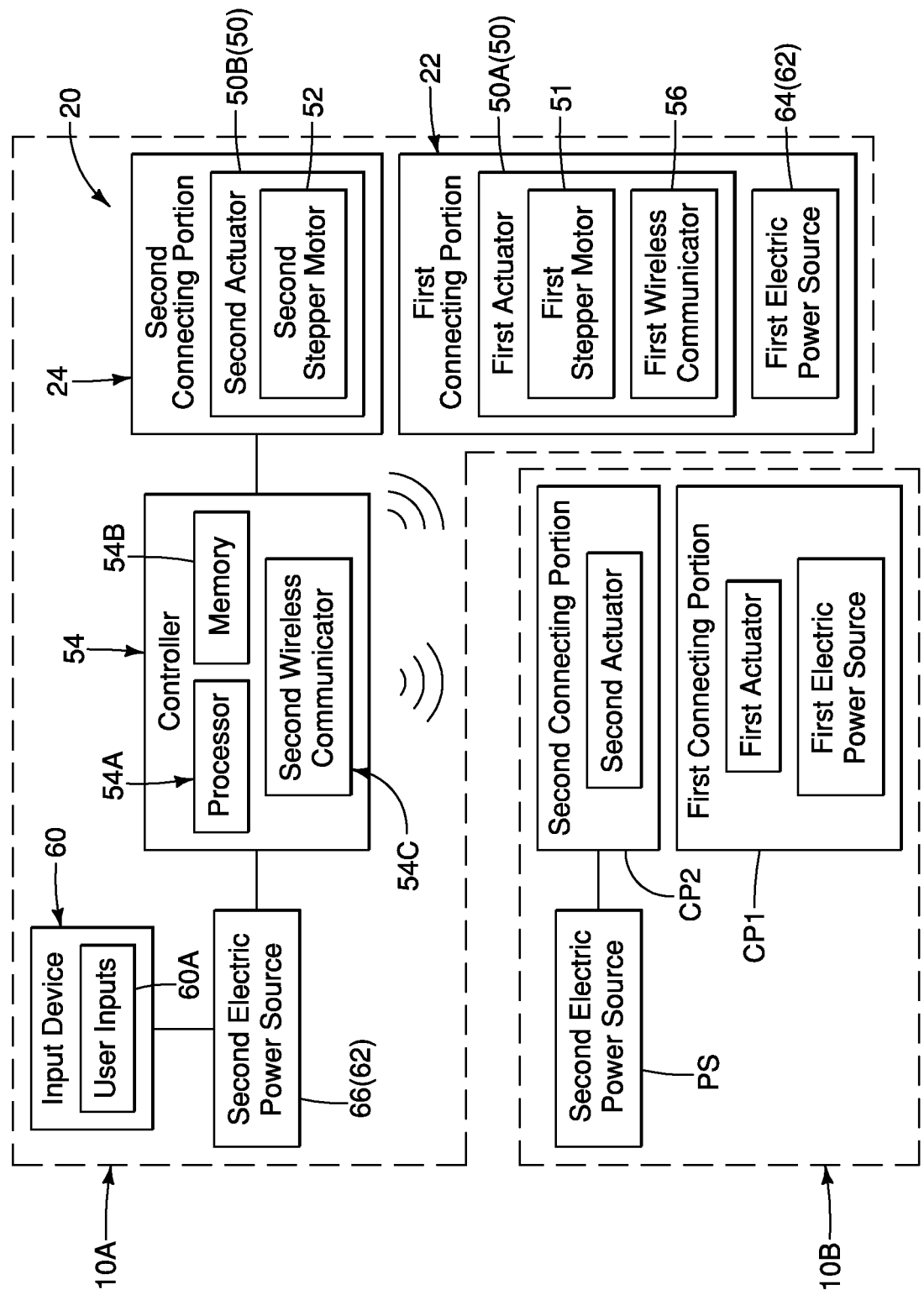
FIG. 9 is an overall diagrammatic view of the cycling shoes that are each equipped with a cleat adapter illustrated in FIGS. 2 to 7.

As seen in FIG. 9, the controller 54 includes least one processor 54A that executes a predetermined control program for selectively operating the first motor 51 and the second motor 52 to position the cleat 30 relative to the sole 12. The at least one processor 54A can be, for example, a central processing unit (CPU) or a micro processing unit (MPU). The controller 54 can include processors provided at positions separate from each other. The controller 54 can include one or more microcomputers. The controller 54 is formed of one or more semiconductor chips that are mounted on a circuit board. Thus, the controller 54 is an electronic controller. The term "electronic controller" as used herein refers to hardware that executes a software program, and does not include a human.

Preferably, the controller 54 further includes memory 54B. The memory 54B stores various control programs and information used for various control processes. The memory 54B is any computer storage device or any non-transitory computer-readable medium with the sole exception of a transitory, propagating signal. For example, the memory 54B includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The controller 54 can be configured to communicate with the first actuator 50A and the second actuator 50B by wired communication and/or a wireless communication. Here, the controller 54 is configured to communicate with the first actuator 50A by wireless communication. The first actuator 50A includes a first wireless communicator 56, and the controller 54 includes a second wireless communicator 54C that is configured to wirelessly communicate with the first wireless communicator 56. On the other hand, the controller 54 is configured to communicate with the second actuator 50B by wired communication. The controller 54 is connected to the second actuator 50A by a wire 58 to communicate. The controller 54 can communicate with the second actuator 50A via power line communication (PLC) and/or a dedicated signal wire.

The term "wireless communicator" as used herein includes a receiver, a transmitter, a transceiver, a transmitter-receiver, and contemplates any device or devices, separate or combined, capable of transmitting and/or receiving wireless communication signals. The wireless communication signals can be radio frequency (RF) signals, ultra-wide band communication signals, radio frequency identification (RFID), ANT+ communications, or Bluetooth® communications or any other type of signal suitable for short range wireless communications as understood in the bicycle field.

The cleat adapter assembly 20 further comprises an input device 60 that is configured to operate the adjuster 26. Here, the input device 60 is provided on the upper 14 of the cycling shoe 10A. Alternatively, a remote input device can be used to wirelessly communicate user commands to the second wireless communicator 54C of the controller 54. The input device 60 includes a plurality of user inputs 60A. Here, the user inputs 60A are buttons. However, the user inputs 60A can include, for example, a toggle switch, a lever, a dial and/or a touch screen. Here, the input device 60 communicates with the controller 54 using power line communication (PLC).

As seen in FIG. 9, the cleat adapter assembly 20 further comprises an electric power source 62 that is configured to provide an electric power to both of the actuator 50 (the first actuator 50A and the second actuator 50B) and the controller 54. For example, the electric power source 62 has a first power source 64 that is configured to provide the electric power to the actuator 50A. The electric power source 62 has a second electric power source 66 that is configured to provide an electric power to the controller 54. The electric power source 62 includes at least one of a coin battery, a rechargeable battery, a capacitor, and a power generator. Here, the first power source 64 preferably includes a power generator and at least one of a rechargeable battery and capacitor. On the other hand, the second electric power source 66 includes a coin battery.

As seen in FIG. 9, the cleat adapter assembly for the cycling shoe 10B includes a first connecting portion CP1 and a second connecting portion CP2. The first connecting portion CP1 is identical to the first connecting portion 22. Thus, the first connecting portion CP1 is provided with a first actuator and a first electric power source in the same manner as the first connecting portion 22. Similarly, the second connecting portion CP2 is identical to the second connecting portion 24. Thus, the second connecting portion CP2 is provided with a second actuator and a second electric power source in the same manner as the second connecting portion 24.

Figure 10:
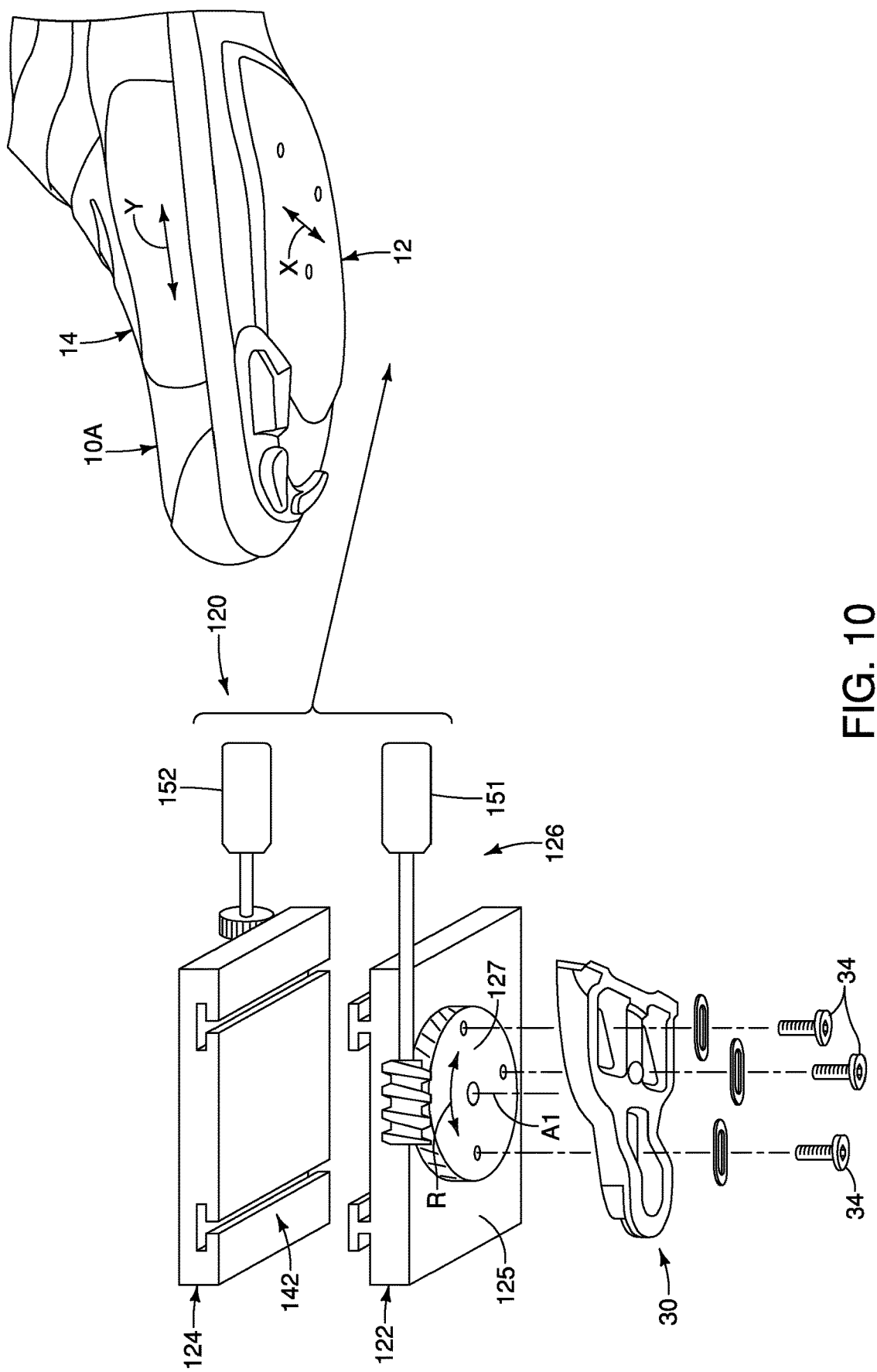
FIG. 10 is a diagrammatic perspective view of a cleat adapter assembly in accordance with another embodiment.

Referring now to FIG. 10, a cleat adapter assembly 120 is diagrammatically illustrated in accordance with another embodiment of the present disclosure. The cleat adapter assembly 120 can be used with the cycling shoe 10A and/or the cycling shoe 10B. The cleat adapter assembly 120 basically comprises a first connecting portion 122, a second connecting portion 124 and an adjuster 126. Here, the first connecting portion 122 is adjustably connected to the second connecting portion 124 by the adjuster 126 in one direction (either the longitudinal direction Y or the lateral direction X). Preferably, the second connecting portion 124 can be mounted to the sole 12 of the cycling shoe 10A in a first orientation in which the second connecting portion 124 is adjustably connected to the first connecting portion 122 by the adjuster 126 in the longitudinal direction Y. Also, the second connecting portion 124 can be alternatively mounted to the sole 12 of the cycling shoe 10A in a second orientation in which the first connecting portion 122 is adjustably connected to the second connecting portion 124 by the adjuster 126 in the lateral direction X. The adjuster 126 includes linear displacement device having a track and rail guide and a rack and pinion drive similar to the one discussed above.

Here, the first connecting portion 122 includes a base part 125 and a rotary mounting plate 127. The rotary mounting plate 127 is rotatably mounted to the base part 125 about an axis A1. In other words, the adjuster 126 is configured to adjust the relative position in a rotational direction R around the axis A1 that is perpendicular to the longitudinal direction Y and the lateral direction X.

In this embodiment, the actuator for the adjuster 126 includes a first motor 151 and a second motor 152. The first motor 151 and the second motor 152 are operatively connected to the adjuster 126 by flexible drive shafts. Thus, the locations of the first motor 151 and the second motor 152 can be conveniently located as needed and/or desired. The first motor 151 and the second motor 152 can be controlled using the controller 54 and the input device 60 as discussed above with respect to the first embodiment. Also, the first motor 151 and the second motor 152 can receive electric power from the electric power source 62 as discussed above with respect to the first embodiment.

Figure 11:
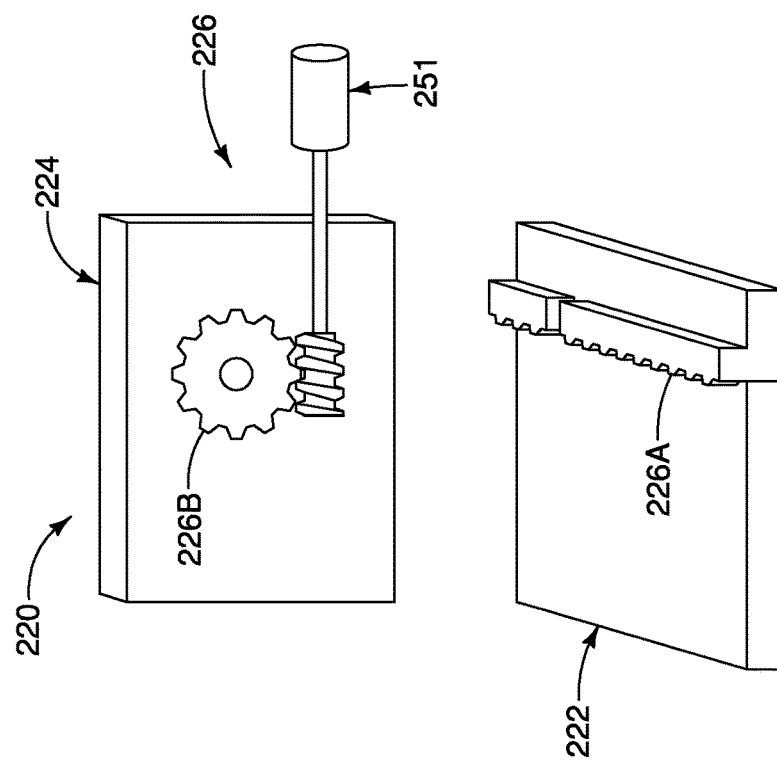
FIG. 11 is a diagrammatic perspective view of a cleat adapter assembly in accordance with another embodiment.

Referring now to FIG. 11, a cleat adapter assembly 220 is diagrammatically illustrated in accordance with another embodiment of the present disclosure. The cleat adapter assembly 220 can be used with the cycling shoe 10A and/or the cycling shoe 10B. The cleat adapter assembly 220 basically comprises a first connecting portion 222, a second connecting portion 224 and an adjuster 226. Here, the adjuster 226 has a single adjustment direction. Preferably, the second connecting portion 224 can be mounted to the sole 12 of the cycling shoe 10A in either a first orientation or a second orientation that is perpendicular to the orientation. In this way, the user can select either a longitudinal adjustment or a lateral adjustment.

In this embodiment, the adjuster 226 includes a rack gear 226A provided to the first connecting portion 222, and a pinion gear 226B provided to the second connecting portion 224. A motor 251 is provided to rotate the pinion gear 226B which is engaged with the rack gear 226A. Thus, rotation of the pinion gear 226B causes the rack gear 226A to move in a linear direction. In this way, the first connecting portion 222 is adjustably connected to the second connecting portion 224 via the adjuster 226.

Figure 12:
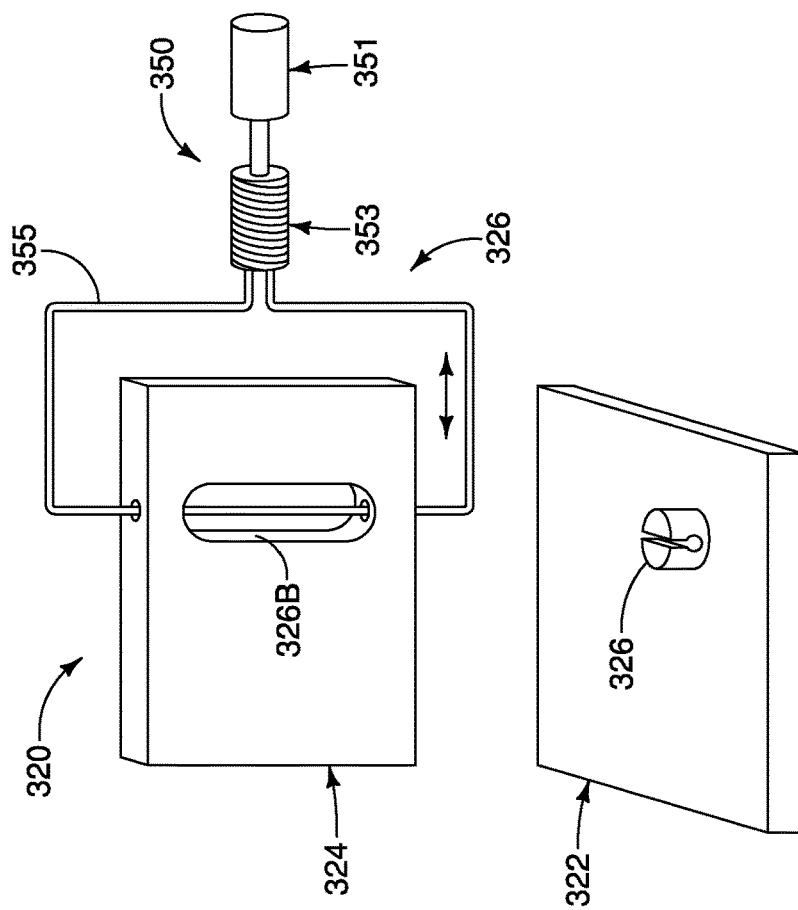
FIG. 12 is a diagrammatic perspective view of a cleat adapter assembly in accordance with another embodiment.

Referring now to FIG. 12, a cleat adapter assembly 320 is diagrammatically illustrated in accordance with another embodiment of the present disclosure. The cleat adapter assembly 320 can be used with the cycling shoe 10A and/or the cycling shoe 10B. The cleat adapter assembly 320 basically comprises a first connecting portion 322, a second connecting portion 324 and an adjuster 326. Here, the adjuster 326 has a single adjustment direction. Preferably, the second connecting portion 324 can be mounted to the sole 12 of the cycling shoe 10A in either a first orientation or a second orientation that is perpendicular to the orientation. In this way, the user can select either a longitudinal adjustment or a lateral adjustment.

In this embodiment, the adjuster 326 includes a guide pin 326A provided to the first connecting portion 322, and a slot 326B provided to the second connecting portion 324. Here, the cleat adapter assembly 320 includes a motor 351 that rotates a spool 353 for moving a cable 355. The guide pin 326A is fixedly coupled to the cable 355 for linear movement in the slot 326B in response to rotation of the spool 353 by the motor 351.

Figure 13:
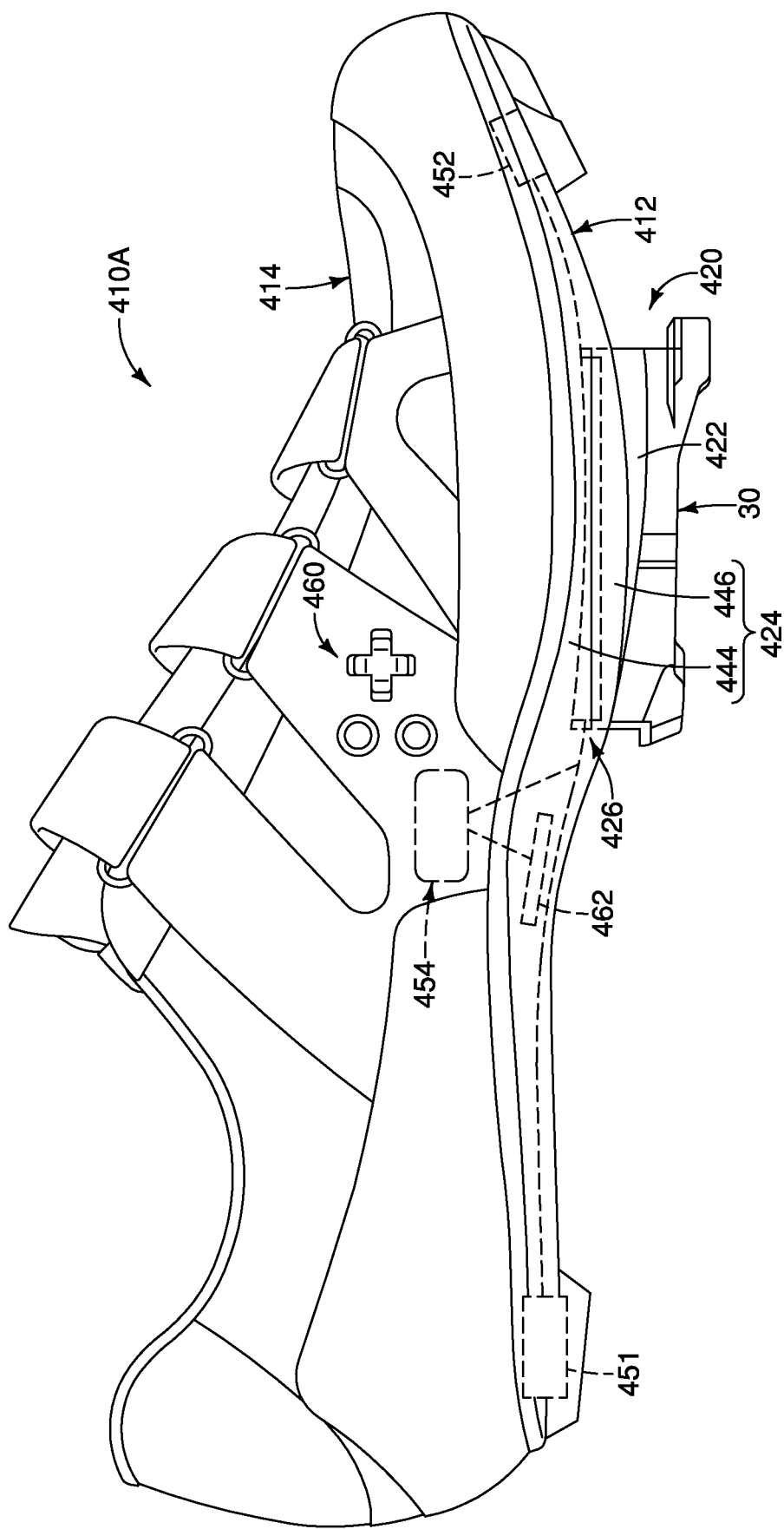
FIG. 13 is a side elevational view of a cycling shoe equipped with a cleat adapter assembly in accordance with another embodiment.

Referring now to FIG. 13, a cycling shoe 410A having a cleat adapter assembly 420 is illustrated in accordance with another embodiment of the present disclosure. The cycling shoe 410A includes a sole 412 and upper 414. Here, the cleat adapter assembly 420 partially integrated into the sole 412 The cleat adapter assembly 420 basically comprises a first connecting portion 422, a second connecting portion 424 and an adjuster 426. Here, the second connecting portion 424 is integrated into the sole 412. More specifically, the second connecting portion 424 includes a first part 444 that is part of the sole 412 and a second part 446 that is adjustably disposed between the first part 444 and the second connecting portion 424. The first connecting portion 422 is adjustably connected to the second connecting portion 424 by the adjuster 426. The adjuster 426 can be identical to the adjuster 26. Alternatively, the adjuster 426 and the first connecting portion 422 and/or the second connecting portion 424 can be modified in accordance with any of the other embodiments. In any case, in this embodiment, the second connecting portion 424 is at least partially formed by the sole 412.

In this embodiment, the actuator for the adjuster 426 includes a first motor 451 and a second motor 452 that are embedded into the sole 412. The first motor 451 and the second motor 452 are connected to the adjuster 426 by flexible drive shafts. Thus, the locations of the first motor 451 and the second motor 452 can be conveniently located as needed and/or desired.

Also, in this embodiment, the cleat adapter assembly 420 further comprises a controller 454 that is configured to control the first motor 451 and the second motor 452. cleat adapter assembly 420 further comprises an input device 460 that is configured to operate the adjuster 426. The cleat adapter assembly 420 further comprises an electric power source 462 that is configured to provide an electric power to the first motor 451, the second motor 452 and the controller 454.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position or the cycling shoe in resting in a horizonal position.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cleat adapter assembly is provided for a cycling shoe, the cleat adapter assembly comprising:
   a first connecting portion configured to be connected to a cleat;
   a second connecting portion adjustably connected to the first connecting portion;
   an adjuster configured to adjust a relative position between the first connecting portion and the second connection portion;
   an actuator configured to actuate the adjuster, and
   a controller configured to control the actuator.

2. The cleat adapter assembly according to claim 1, further comprising
   an input device configured to operate the adjuster.

3. The cleat adapter assembly according to claim 1, wherein
   the first connecting portion includes a nut part configured to be fix the cleat to the first connecting portion, and
   the second connecting portion is provided to a sole of the cycling shoe.

4. The cleat adapter assembly according to claim 1, wherein
   the controller is connected to the actuator by a wire to communicate.

5. The cleat adapter assembly according to claim 1, wherein
   the actuator includes a first wireless communicator, and
   the controller includes a second wireless communicator configured to wirelessly communicate with the first wireless communicator.

6. The cleat adapter assembly according to claim 1, wherein
   the controller is provided to one of the cycling shoe and an additional cycling shoe associated with the cycling shoe to constitute a pair of cycling shoes.

7. The cleat adapter assembly according to claim 1, wherein
   the adjuster is configured to adjust the relative position in a first direction and a second direction different with the first direction.

8. The cleat adapter assembly according to claim 7, wherein
   the first direction is a longitudinal direction of a sole of the cycling shoe.

9. The cleat adapter assembly according to claim 7, wherein
   the second direction is a lateral direction of a sole of the cycling shoe.

10. The cleat adapter assembly according to claim 1, wherein
    the cycling shoe includes a sole defining a longitudinal direction and a lateral direction perpendicular to the longitudinal direction, and
    the adjuster is configured to adjust the relative position in a rotational direction around an axis perpendicular to the longitudinal direction and the lateral direction.

11. The cleat adapter assembly according to claim 1, wherein
    an electric power source configured to provide an electric power to both of the actuator and the controller.

12. The cleat adapter assembly according to claim 11, wherein
    the electric power source includes at least one of a coin battery, a rechargeable battery, a capacitor and a power generator.

13. The cleat adapter assembly according to claim 11, wherein
    the electric power source has a first power source configured to provide the electric power to the actuator.

14. The cleat adapter assembly according to claim 11, wherein
    the electric power source has a second electric power source configured to provide an electric power to the controller.

15. The cleat adapter assembly according to claim 1, wherein
    the actuator includes a motor configured to adjust the relative position in discrete steps.

* * * * *